March 26, 1963 R. E. HAIMBAUGH ET AL 3,083,285
APPARATUS FOR HEAT TREATING THE ENDS OF WORK PIECES
Filed Oct. 13, 1960 2 Sheets-Sheet 1

INVENTORS.
Richard E. Haimbaugh
Omer L. Haimbaugh
By Silverman, Mullin & Coss
Attorneys

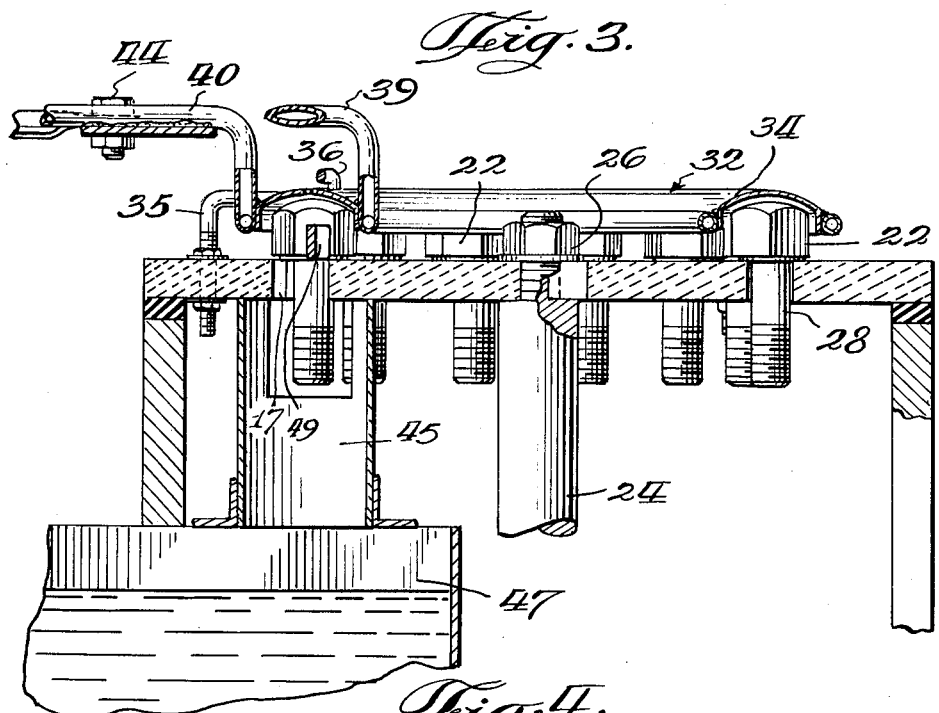
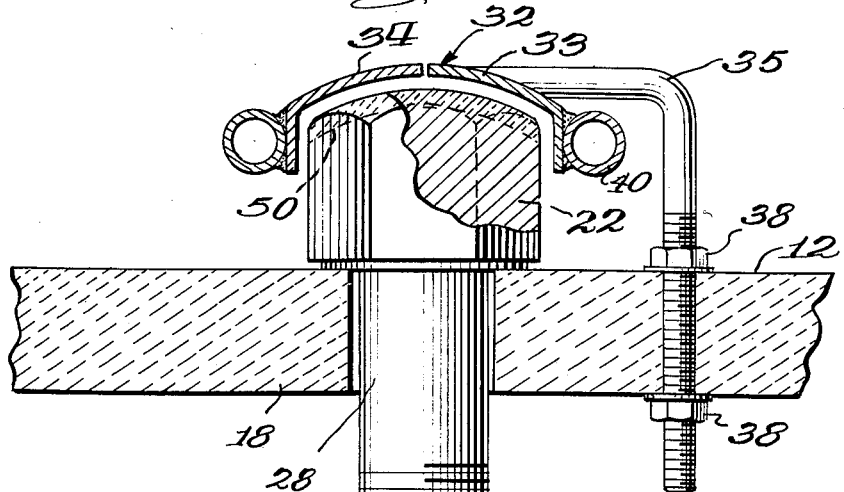

United States Patent Office 3,083,285
Patented Mar. 26, 1963

3,083,285
APPARATUS FOR HEAT TREATING THE ENDS
OF WORK PIECES
Richard E. Haimbaugh and Omer L. Haimbaugh, Woodstock, Ill., assignors to Induction Heating and Engineering Corporation, Chicago, Ill., a corporation of Illinois
Filed Oct. 13, 1960, Ser. No. 62,453
9 Claims. (Cl. 219—10.69)

This invention relates in general to heating apparatus and more particularly to an arrangement wherein juxtaposed or adjacent parts or work pieces are carried in succession through a heating cycle.

Modern industrial and domestic apparatus comprise metal parts and components that are often subjected to long and continuous wear and abrasion. It has therefore become a necessity to apply special treatment to such parts. This treatment generally comprises the application of considerable heat followed by quenching thereby hardening the constituent material to enable it to withstand subsequent abuse. The heat is usually supplied by an induction coil and the metal part to be treated or hardened must be passed adjacent the coil and thereby subjected to extensive heat after which it is placed in a liquid bath which quenches or cools the part.

Some of the problems with which such a process must deal, relate to the provision of economical apparatus for manipulating the parts, the uniform heating of a desired portion of the parts and the time period within which heat is applied and the parts quenched, and of course where numerous small parts must be handled on a mass production basis these problems are correspondingly magnified.

One object of the present invention is to provide an economical system or apparatus whereby a large number of parts may be treated and quenched at desired rates and with uniform results and employing a unique arrangement for achieving these ends.

First, consider, for example, parts such as bolts used to secure track shoes on crawler tractors and the like, having heads which must be treated to withstand the tremendous abrasion of such parts, but which must have toughness below the head and in the shank. These must each be sent through a heating cycle with the heads properly and uniformly related to the coil and thereafter quenched. If special work holders are to be used for ensuring that the heads are properly positioned, the process and apparatus becomes expensive both because of the work holders and because the bolts must each be positioned in a work holder and thereafter released therefrom before the quench.

The present invention utilizes drive apparatus which functions to move the parts successively into relationship with the heating coil both for rotating the bolts to provide uniform heat and moving them on a continuous path; and thereafter automatically releasing the bolts and dropping them quickly into the quench bath. This is done in a novel manner by providing a progressive rotation fixture which incorporates an annular space between the periphery of a turning or rotating disc or element and a stationary support or table upon which the induction coil is mounted. The space adjacent the periphery of the rotating disc receives the shanks of the screws or bolts so that they are rotatably carried in succession in the inductive field of the coil with their heads supported by the disc and the table. The rotation is due to the frictional engagement of the rotating disc against the underside of the head of the bolt on one side thereof and the relative rotation in the opposite direction of the table engaging the diametrically opposite underside of the bolt head. The rotation, of course, provides for uniform heating while the parts are moved past the induction coil and in the influence of the inductive field at a uniform desired rate of speed depending on the speed of rotation of the disc. After being heat-treated, the pieces are carried into registration with an aperture or recess in the table whereby they drop into a quench bath. In addition as the parts are in adjacent positions without any unnecessary spacing therebetween, greater quantities thereof may be simultaneously related to the coil and heated thereby providing maximum efficiency in production.

This arrangement eliminates the complications present in separately manipulating such parts and attaching them to work holders, together with the expense of providing such work holders and is further effective in simplifying the junction of quenching. There is no need to detach work pieces from work holders to permit quenching.

It is therefore an object of this invention to provide an improved heat treating arrangement or system.

It is a further object of this invention to provide heat treating arrangement for numerous parts having a common work holding arrangement for moving the parts in predetermined relationship past a heating element.

It is a further object of this invention to provide a heat treating arrangement in which parts are subjected to heat treatment and quenching at desired and controlled rates.

It is another important object of this invention to ensure that all parts being subjected to a heat treatment be uniformly related to a heating element.

It is another important object of this invention to provide in a device of the character described, improved means for moving a heat treated part into a quench bath.

It is still a further object of this invention to provide a more efficient arrangement for heat treating separate successive parts.

It is still a further object of this invention to provide a flexible, economic heat treating arrangement which may be used for treating parts of considerable size variance.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated.

Referring to the drawing in which the same characters of reference are employed to indicate corresponding or similar parts throughout the several figures of the drawing:

FIG. 3 is a sectional view taken generally through the apparatus along the line 3—3 in FIG. 2, and in the direction shown.

FIG. 4 is a sectional view taken generally through the line 4—4 in FIG. 1 and in the direction indicated to show the relationship between a part being heated and the induction coil.

Figure 1:
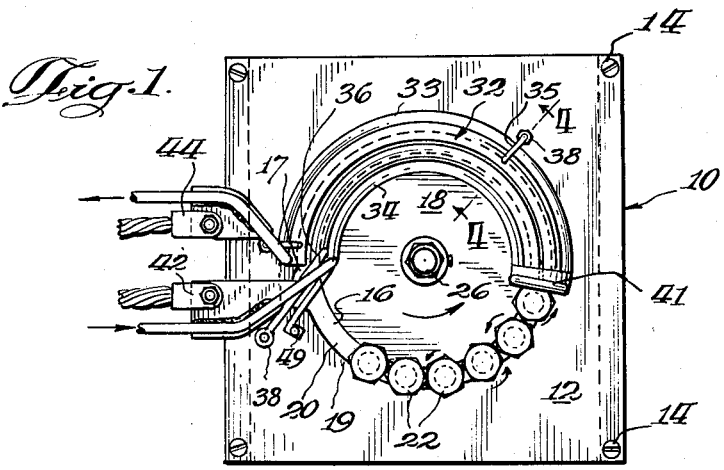
FIG. 1 is a top plan view of the apparatus of the present invention showing a series of track shoe bolts being carried through a treating cycle.
Figure 2:
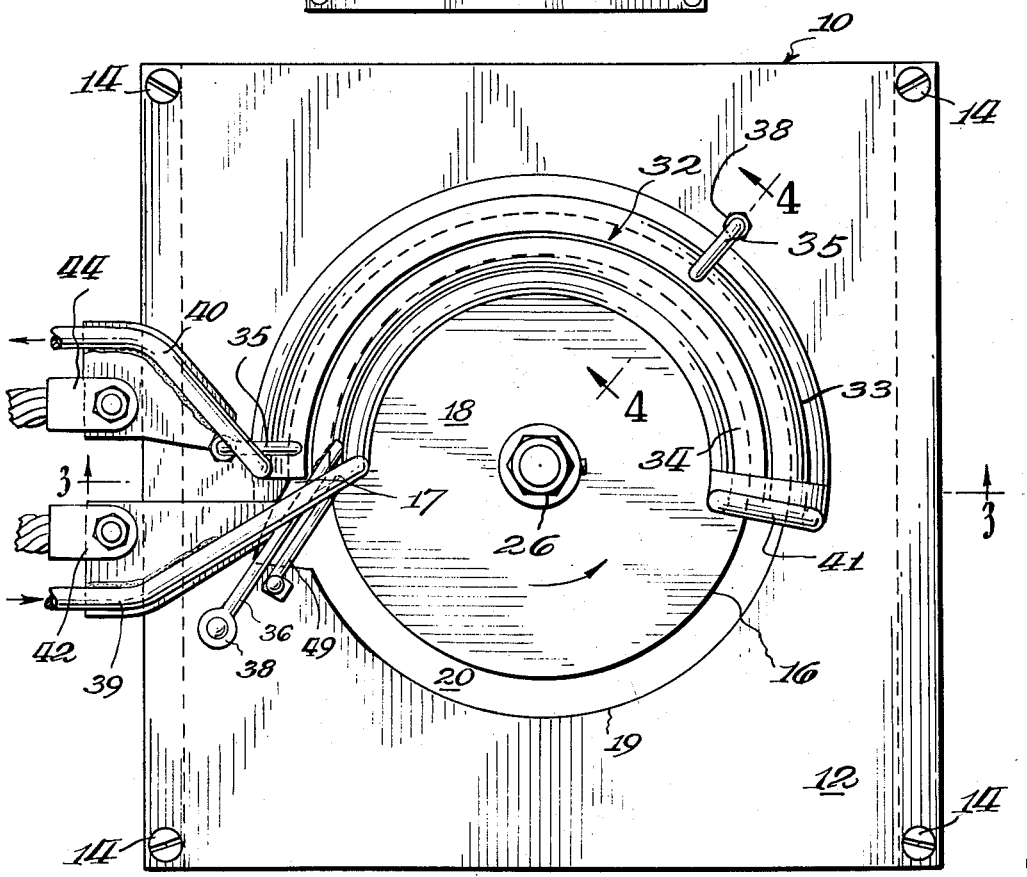
FIG. 2 is an enlarged view of the same apparatus but with no work pieces disposed in the apparatus.

Referring now to FIGS. 1 and 2, it will be seen that the heat treating apparatus of the present invention is generally indicated by the reference character 10 and comprises a stationary table 12. The table 12 is of non-conductive material and it is supported on insulating blocks such as 13, as viewed in FIG. 3, resting on an appropriate support to which table 12 is secured by screws 14 or the like. The center of the table 12 is cut out to form a circular opening or aperture 16, of non-conductive material. A rotatable disc 18 is mounted in the aperture 16 coaxially therewith, said disc 18 being of a diameter less than that of the aperture, thereby forming therewith an annular slot or guideway 20. It is intended that bolts or other headed work pieces such as the track shoe bolts shown at 22 in FIG. 3 will be disposed with their shanks depending into the annular slot 20 and be carried along the said slot into the inductive field of the heating coil. The circular slot 20 is adapted to receive the shanks 28 as seen in FIG. 3 of the various bolts whose heads are indicated at 22 in FIG. 1. As may be seen, the disc 18 is dimensioned substantially to occupy the aperture 16 to an extent that the shanks 28 are slightly spaced from the edge of the disc 18 and the table 12. The undersides of the heads 22 are engaged by the disc 18 whereby the rotation of the disc 18 both rotates the bolts on their respective axes and moves them in the direction in which the disc 18 is rotating. Alternatively the disc 18 may frictionally engage the shanks of the bolts between the disc and table 12 so that the bolts are moved responsive to that frictional engagement or in cooperation with the frictional engagement with the underside of the bolt heads.

It will immediately be seen that when the shanks 28 are placed in the slot 20, the heads 22 are stably supported between table 12 and disc 18 on a plane such that each head 22 will be identically related to the heating coil 32 to be described.

The disc 18 rests on the shoulder of a rotatable shaft 24 as seen in FIG. 3, and it is fastened thereto by means of the nut 26 which threads onto the shaft 24. This seats the disc 18 against the shoulder on the shaft and maintains its position. As may be appreciated, this forms an important contribution to the invention by permitting a simple change in disc to accommodate another size bolt in the slot 20 whereby the flexibility of the apparatus is extended.

An arcuate coil 32 is disposed to occupy approximately half the circumference of the slot 20 and is arranged spaced above said slot. Said coil comprises metal members 33 and 34 which are suitably supported for example in the adjustable supports 35 and 36 respectively from and above the level of the stationary table 12 and the bolt heads 22. The height of the coil members 33 and 34 may be adjusted as desired by loosening the nuts 38 and lifting the support elements 35 and 36 and thereafter tightening nuts 38. If desired, the coil members 33 and 34 may be supported from an overhead or other element separate from the table and disc. This permits both or either the table and disc to be moved for carrying the bolts under the coil. Thus the arrangement is capable of considerable flexibility in the choice of the moving component.

As may be seen in FIG. 4, the members 33 and 34 are aligned and spaced apart, and each has an arcuate lower surface adapted to conform to the curvature of the part to be treated. The members 33 and 34 are bridged at one end as shown in FIG. 3. Each also has a coolant conduit in the form of a pipe secured as by soldering or welding adjacent the outer edge thereof, there being a reverse bend at 41 forming an end bridge. This cooling liquid is carried, for example, from the conduit indicated at 39 to the outlet conduit indicated at 40. Electrical terminals 42 and 44 are attached to the conduits 39 and 40 to supply high frequency current to the coil members 33 and 34, however, it should be understood that the means by which liquid is fed to conduits comprise non-conductive material arranged to carry the cooling liquid thereto in any well-known manner.

At this point an alternative arrangement for accommodating different size bolts will be described. Thus various tables, each with a different size central aperture, such as 16, each carrying a coil set up to accommodate a corresponding size bolt head, can be quickly and easily interchanged by simply disconnecting the conduits 39 and 40 and the electrical connectoins and the four fastening screws 14 seen in FIG. 2. This avoids the problem of adjusting or mounting different coils to accommodate different sizes of bolts and permits the various sizes to be accommodated by simply securing an alternate table 12 into place, with the coil already properly positioned.

A recess 17 is provided in the table 12 adjacent the end of the coil members 33 and 34 to create a widened space between the disc 18 and table 12 whereby the respective bolts fall through the recess 17. Located below recess 17 is a guideway 45 as seen in FIG. 3 for guiding the bolts into the quench bath indicated at 47. In addition, the stop bar 49 is provided at the recess 17 to disengage any bolt from disc 18 in the event it is carried by the disc beyond the beginning of recess 17 so that each bolt must be disengaged from the carrying arrangement and deposited in the bath.

The quench bath comprises a suitable liquid directly below the recess 17 for cooling the bolts to a desired temperature. It will be appreciated that this arrangement permits the immediate quenching of the parts and without any unnecessary manipulations.

The operation of the heat treating apparatus 10 proceeds with the bolts or screws deposited so that the respective shanks 28 depend from the disc 18 and table 12 into the slot having a slight space between the shanks and the edge of disc 18 and the edge 19 of the table 12. The heads 22 rest partially on the disc 18 and the table 12.

This disc 18 may be of any desired size which will accommodate the required shank.

As the disc 18 rotates it moves the portion of the underside of the heads carried thereby, while another portion is slightly restrained due to the engagement with table 12. Thus the bolts move forward in the direction in which disc 18 rotates while simultaneously the bolts rotate on their axis. The direction of indicated operation or movement is purely one of choice, and the disc 18 may be rotated in any desired direction to move the bolts accordingly.

As the bolts move along slot 20, they pass beneath the arcuate confines of the coil 32. As the heads 22 are all supported in an identical or similar position and are rotated as they pass beneath the coil 32, they are each uniformly heated to a depth as, for example, indicated by the broken line 50 in FIG. 4.

It will be noted that as the bolts pass beneath the coil 32, each successive bolt is positioned immediately adjacent the one in front and the one behind, so that waste space is minimized, and the treatment of numerous parts occurs simultaneously. In addition, the passage of the bolts beneath the coil is controlled by the speed at which disc 18 rotates, and this, of course, may be varied as desired. Also, a pyrometer or other temperature responsive device may be associated with the bolts as they pass beneath the coil and used to regulate the speed of disc 18 depending on the temperature at the device.

After the bolts have passed beneath the coil 32, they come adjacent the widened portion of slot 20 formed by the recess 17, whereby the respective heads are no longer supported by the table 12. They, therefore, drop successively into the liquid quench bath indicated at 47. The stop bar 49 causes the disengagement of any bolt carried by the disc 17 in the event it fails to fall immediately into the bath 47.

While there has been shown and described one embodiment of our invention whereby bolts and the like are rotatably carried past a heating element, the invention is not limited to the precise structure or shapes shown or the particular bolts, but may take many forms in which the drive apparatus functions also as the work holding apparatus to accomplish the purposes of the present invention.

What we claim is:

1. For use in heat treating bolts or screws and the like in succession, the improvement comprising, a stationary table having an aperture, a disc mounted for rotation in said aperture and having its edge spaced apart from the edge of said aperture whereby the shanks of said bolts or screws are carried in said aperture with the heads of said bolts or screws resting partially on said table and partially on said disc, said disc arranged to frictionally engage said heads for rotatably moving said bolts or screws in one direction dependent on the direction of rotation of said disc, and a heating element spaced apart from said edges and in predetermined relationship thereto whereby said bolts or screws when moved in said one direction are brought into successive association with said heating element.

2. The arrangement claimed in claim 1 in which the edge of said aperture is spaced apart from the edge of said disc by an amount greater than the size of said heads at a predetermined position along said aperture edge whereby said bolts or screws are automatically disengaged from said disc and table for engagement with a liquid bath on being moved into said position.

3. The arrangement claimed in claim 1 in which said heating element comprises a pair of coil members adapted to be energized by a high frequency current and having a configuration along one axis corresponding to the configuration of said disc and a configuration transverse to said axis corresponding to the shape of said heads.

4. Apparatus for heat treating metal work pieces in succession comprising, a table member having an aperture in the support surface thereof, a support element mounted in said aperture in a plane parallel to the plane of the support surface, and having its marginal rim spaced from and facing the peripheral edge of the aperture to provide an arcuate passageway between said member and element of predetermined width selected to enable support of said work pieces therein frictionally engaged with both the member and element, said member and element being rotatable one relative to the other for moving said work pieces engaged therewith along the passageway with adjacent work pieces respectively engaged one with the other and rotating the work pieces concurrently with said movement thereof along the passageway, and a heating element spaced from the said rim and edge and in predetermined relationship thereto whereby said work pieces are brought in successive association with said heating element for heat treatment thereof.

5. Apparatus as described in claim 4 in which at least one of said table member and support element has means associated with said passageway for automatically releasing the work pieces successively at a predetermined location along said passageway.

6. In apparatus for heat-treating bolts or scwers and the like in succession, a table having an aperture in the support surface thereof, a disc mounted in said aperture and having its marginal edge spaced from and facing the edge of the aperture a predetermined width selected to permit said bolts or screws to be supported in the aperture frictionally engaged with both of said edges, at least said disc or table being rotatable one relative to the other for rotatably moving said bolts or screws engaged therewith in one direction along the aperture dependent upon the direction of said relative rotation of said member and disc, a heating element located spaced from said edges to heat-treat said bolts or screws during said rotary movement thereof in said one direction, said disc and table having cooperating means for automatically releasing the work piece successively at a predetermined location along said aperture edge.

7. In apparatus for heat-treating bolts or screws and the like in succession, a table having an aperture in the support surface thereof, a disc mounted in said aperture and having its marginal edge spaced from and facing the edge of the aperture whereby to permit said bolts or screws to be supported in the aperture frictionally engaged with both of said edges, at least said disc or table being rotatable one relative to the other for rotatably moving said bolts or screws in one direction along the aperture dependent upon the direction of said relative rotation of said member and disc, a heating element located spaced from said edges to heat-treat said bolts or screws during said rotary movement thereof in said one direction, said disc and table having cooperating means for automatically releasing the work pieces successively at a predetermined location along said aperture edge, comprising, said spacing between said edges being enlarged at said location to eliminate said frictional engagement of the work pieces with said edges.

8. A structure as described in claim 6 in which said table and disc are removably associated together so as to permit replacement of either one of said table and disc members for varying the width of said space between said facing edges.

9. For use in heat treating work piece such as, bolts or screws and the like, a table having an aperture in the support surface thereof, a disc mounted in said aperture and having a marginal edge spaced from and facing the peripheral edge of the aperture to provide an arcuate guide channel, the width of said channel being selected to enable said work pieces to be supported therein frictionally engaged with both of said edges, said table and disc being rotatable one relative to the other for moving said work pieces along the channel and rotating the work pieces concurrently, an electrical heating element spaced from said edges and located to heat-treat said work pieces during said rotary movement thereof along the channel, at least one of said edges having a point therealong spaced from the other edge a distance greater than the first mentioned space to enable automatic release of the work pieces successively when said point is reached by the work pieces.

References Cited in the file of this patent

UNITED STATES PATENTS

| | | |
|---|---|---|
| 1,284,638 | Foss | Nov. 12, 1918 |
| 1,959,123 | Chapman | May 15, 1934 |
| 2,470,311 | Hoyler et al. | May 17, 1949 |
| 2,700,182 | Bosomworth et al. | Jan. 25, 1955 |
| 2,707,629 | Kennedy | May 3, 1955 |